US012394884B2

(12) United States Patent
Yang

(10) Patent No.: US 12,394,884 B2
(45) Date of Patent: Aug. 19, 2025

(54) ANTENNA ASSEMBLY AND ELECTRONIC DEVICE

(71) Applicant: GUANGDONG OPPO MOBILE TELECOMMUNICATIONS CORP., LTD., Dongguan (CN)

(72) Inventor: Fan Yang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 553 days.

(21) Appl. No.: 17/940,874

(22) Filed: Sep. 8, 2022

(65) Prior Publication Data

US 2023/0006360 A1 Jan. 5, 2023

Related U.S. Application Data

(63) Continuation of application No. PCT/CN2021/073548, filed on Jan. 25, 2021.

(30) Foreign Application Priority Data

Mar. 12, 2020 (CN) ......................... 202010169503.7
Mar. 12, 2020 (CN) ......................... 202020306450.4

(51) Int. Cl.
*H01Q 1/24* (2006.01)
*H01Q 1/44* (2006.01)
(Continued)

(52) U.S. Cl.
CPC ............... *H01Q 1/243* (2013.01); *H01Q 1/44* (2013.01); *H01Q 5/328* (2015.01); *H01Q 5/335* (2015.01)

(58) Field of Classification Search
CPC ................................. H01Q 1/243; H01Q 1/44
See application file for complete search history.

(56) References Cited

U.S. PATENT DOCUMENTS 10,200,092 B1 * 2/2019 Irci ...................... H04B 7/0413
12,334,644 B2 * 6/2025 Wang ..................... H01Q 5/328
(Continued)

FOREIGN PATENT DOCUMENTS

CN 106898860 A 6/2017
CN 206271882 U 6/2017
(Continued)

OTHER PUBLICATIONS

International Search Report and Written Opinion dated Apr. 16, 2021 in International Application No. PCT/CN2021/073548. English translation attached.

(Continued)

*Primary Examiner* — Ab Salam Alkassim, Jr.
(74) *Attorney, Agent, or Firm* — Sheppard, Mullin, Richter & Hampton LLP

(57) ABSTRACT

Provided is an antenna assembly including a conductive frame, and a resonance unit. The conductive frame is divided into first and second conductive branch by a slot. The resonance unit includes first and second resonance circuits. One terminal of the second resonance circuit is grounded, and another terminal is connected to the second conductive branch. A first signal source is capable of feeing a first current signal to the first conductive branch through the first resonance circuit and the first feeding point, enabling the first conductive branch to radiate a first radio frequency signal. The second signal source is capable of feeding a second current signal to the second conductive branch through the second feeding point, enabling the second conductive branch, under a resonance of the second resonance circuit, to radiate a second radio frequency signal.

20 Claims, 7 Drawing Sheets

(51) Int. Cl.
*H01Q 5/328* (2015.01)
*H01Q 5/335* (2015.01)

(56) References Cited

U.S. PATENT DOCUMENTS

| | | | | |
|---|---|---|---|---|
| 2009/0135071 | A1 | 5/2009 | Huang et al. | |
| 2012/0176293 | A1* | 7/2012 | Itho | H01Q 5/50 343/848 |
| 2018/0026353 | A1* | 1/2018 | Tseng | H01Q 13/10 455/575.7 |
| 2018/0026354 | A1* | 1/2018 | Lin | H01Q 5/335 343/702 |
| 2018/0062244 | A1* | 3/2018 | Huang | H01Q 5/371 |
| 2018/0183151 | A1* | 6/2018 | Zhao | H01Q 5/314 |
| 2018/0358699 | A1* | 12/2018 | Li | H01Q 9/42 |
| 2019/0044218 | A1* | 2/2019 | Ye | H01Q 5/50 |
| 2019/0081385 | A1* | 3/2019 | Avser | H01Q 5/328 |
| 2019/0181553 | A1* | 6/2019 | Lee | H01Q 5/35 |
| 2019/0252764 | A1* | 8/2019 | Liao | H01Q 5/378 |
| 2022/0037764 | A1* | 2/2022 | Hsu | H01Q 1/36 |
| 2022/0069468 | A1* | 3/2022 | Hsu | H01Q 5/20 |
| 2022/0123469 | A1* | 4/2022 | Hsu | H01Q 9/42 |
| 2022/0140471 | A1* | 5/2022 | Sun | H01Q 1/48 343/702 |
| 2022/0407227 | A1* | 12/2022 | Hsu | H01Q 5/371 |
| 2023/0006335 | A1* | 1/2023 | Yang | H01Q 1/38 |
| 2023/0006336 | A1* | 1/2023 | Yang | H01Q 9/30 |
| 2023/0006345 | A1* | 1/2023 | Yang | H01Q 1/44 |
| 2023/0344151 | A1* | 10/2023 | Wu | H01Q 9/42 |
| 2023/0344152 | A1* | 10/2023 | Wu | H01Q 1/521 |
| 2023/0352852 | A1* | 11/2023 | Wu | H01Q 1/241 |
| 2023/0361467 | A1* | 11/2023 | Wu | H01Q 9/42 |
| 2023/0387572 | A1* | 11/2023 | Xing | H01Q 21/0006 |
| 2023/0387594 | A1* | 11/2023 | Wu | H01Q 5/335 |
| 2023/0420846 | A1* | 12/2023 | Wu | H01Q 1/48 |
| 2024/0072418 | A1* | 2/2024 | Wu | H03H 7/38 |
| 2024/0113416 | A1* | 4/2024 | Zhao | H01Q 9/42 |
| 2024/0113436 | A1* | 4/2024 | Garrido Lopez | H01Q 1/243 |
| 2024/0178577 | A1* | 5/2024 | Lin | H01Q 21/29 |
| 2025/0087890 | A1* | 3/2025 | Nafe | H01Q 9/0485 |

FOREIGN PATENT DOCUMENTS

| | | | | | |
|---|---|---|---|---|---|
| CN | 107017457 | A | | 8/2017 | |
| CN | 107565209 | A | | 1/2018 | |
| CN | 108470977 | A | | 8/2018 | |
| CN | 108511905 | A | * | 9/2018 | H01Q 1/44 |
| CN | 208522084 | U | * | 2/2019 | |
| CN | 109546311 | A | | 3/2019 | |
| CN | 109586036 | A | | 4/2019 | |
| CN | 109687115 | A | | 4/2019 | |
| CN | 110165382 | A | | 8/2019 | |
| CN | 110492237 | A | | 11/2019 | |
| CN | 209981470 | U | | 1/2020 | |
| CN | 211350951 | U | | 8/2020 | |
| CN | 212136680 | U | | 12/2020 | |
| CN | 212136686 | U | | 12/2020 | |
| JP | 2013211797 | A | | 10/2013 | |
| WO | 2016161653 | A1 | | 10/2016 | |

OTHER PUBLICATIONS

The Grant Notice from corresponding Chinese Application No. 202020306450.4, dated Sep. 15, 2020 . English translation attached.
Extended European Search Report dated Jul. 3, 2023 received in European Patent Application No. EP21768359.8.
The First Office Action from corresponding Chinese Application No. 202010169503.7 dated Apr. 7, 2024. English translation attached.
The Grant Notice from corresponding Chinese Application No. 202010169503.7, dated May 13, 2024. English translation attached.

* cited by examiner

ANTENNA ASSEMBLY AND ELECTRONIC DEVICE

CROSS-REFERENCE TO RELATED APPLICATIONS

This application is a continuation of International Application No. PCT/CN2021/073548, filed on Jan. 25, 2021, which claims priority to Chinese Patent Application Nos. 202020306450.4 and 202010169503.7, filed with the China National Intellectual Property Administration on Mar. 12, 2020, and entitled "ANTENNA ASSEMBLY AND ELECTRONIC DEVICE", the entire contents of which are incorporated herein by reference.

FIELD

The present disclosure relates to the field of antenna technology, and more particularly, to an antenna assembly and an electronic device.

BACKGROUND

The statements herein merely provide background information related to the present disclosure, and do not necessarily constitute the prior exemplary art.

With the rapid development of the national economy, positioning technology has been widely used in many fields of national life and science and technology. Meanwhile, people's demand for positioning is becoming stronger and stronger, and people's demand for multi-band antennas is bigger and bigger.

General satellite positioning antennas use a GPS L1 frequency band. However, due to their own technical characteristics, the GPS L1 frequency band antenna is not accurate when used, which limits its application in the fields of navigation and motion recording. In order to improve a positioning accuracy, it is usually necessary to configure an additional antenna to receive dual-frequency positioning signals to increase the positioning accuracy of the GPS. However, the additionally configured antenna can only be moved to the non-clearance region of the electronic device, which may increase a space occupied by the antenna in the electronic device.

SUMMARY

According to various embodiments of the present disclosure, an antenna assembly and an electronic device are provided.

An antenna assembly includes: a conductive frame, a resonance unit, and a signal source unit. The conductive frame is divided into a first conductive branch and a second conductive branch by a slot. The first conductive branch is provided with a first feeding point. The second conductive branch is provided with a second feeding point. The resonance unit includes a first resonance circuit and a second resonance circuit. One terminal of the second resonance circuit is grounded, and another terminal of the second resonance circuit is connected to the second conductive branch. The signal source unit includes a first signal source and a second signal source. The first signal source is capable of feeding a first current signal to the first conductive branch through the first resonance circuit and the first feeding point, enabling the first conductive branch to radiate a first radio frequency signal at least including a first satellite positioning signal. The second signal source is capable of feeding a second current signal to the second conductive branch through the second feeding point, enabling the second conductive branch, under a resonance of the second resonance circuit, to radiate a second radio frequency signal at least including a second satellite positioning signal. An operating frequency band of the first satellite positioning signal is different from an operating frequency band of the second satellite positioning signal.

An electronic device includes: a substrate, a conductive frame, a resonance unit, and a signal source unit. The conductive frame is divided into a first conductive branch and a second conductive branch by a slot. The first conductive branch is provided with a first feeding point. The second conductive branch is provided with a second feeding point. The resonance unit includes a first resonance circuit and a second resonance circuit. One terminal of the second resonance circuit is grounded, and another terminal of the second resonance circuit is connected to the second conductive branch. The signal source unit includes a first signal source and a second signal source. The first signal source is capable of feeding a first current signal to the first conductive branch through the first resonance circuit and the first feeding point, enabling the first conductive branch to radiate a first radio frequency signal at least including a first satellite positioning signal. The second signal source is capable of feeding a second current signal to the second conductive branch through the second feeding point, enabling the second conductive branch, under a resonance of the second resonance circuit, to radiate a second radio frequency signal at least including a second satellite positioning signal. An operating frequency band of the first satellite positioning signal is different from an operating frequency band of the second satellite positioning signal. The substrate is accommodated in a cavity enclosed by the conductive frame. The resonance unit and the signal source unit are disposed on the substrate.

In the antenna assembly and the electronic device as described, the same slot is shared by the first conductive branch and the second conductive branch to simultaneously achieve radiation of the first satellite positioning signal and the second satellite positioning signal, which can achieve radiation of a dual-frequency satellite positioning signal to improve positioning accuracy while improving space utilization of the slot and the conductive frame in the electronic device. Meanwhile, the first radiator and the second radiator can be integrated on the top frame or the bottom frame of the electronic device, which in turn reduces challenge of integrating the antenna assembly on the side frame to reduce a cross-sectional height of the side frame.

The details of one or more embodiments of the present disclosure are set forth in the accompanying drawings and the description below. Other features, objects and advantages of the present disclosure will become apparent from the description, drawings and claims.

BRIEF DESCRIPTION OF DRAWINGS

In order to clearly explain the embodiments of the present disclosure or the technical solutions in the related art, the accompanying drawings used in the embodiments or in the related art are briefly described below. Obviously, the drawings as described below are merely some embodiments of the present disclosure. Based on these drawings, other drawings can be obtained by those of ordinary skill in the art without creative effort.

DESCRIPTION OF EMBODIMENTS

In order to make the purpose, technical solutions and advantages of the present disclosure more clearly understood, the present disclosure will be described in further detail below with reference to the accompanying drawings and embodiments. It should be understood that the specific embodiments described herein are only used to explain the present disclosure, rather than limiting the present disclosure.

It should be understood that the terms "first," "second," etc. used in the present disclosure may be used herein to describe various elements, and these elements are not limited by these terms. These terms are only used to distinguish a first element from another element, and should not be construed to indicate or imply relative importance or to imply the number of indicated technical features. Thus, a feature associated with "first," "second" may explicitly or implicitly include at least one of that features. In the description of the present disclosure, "plurality" means at least two, such as two, three, etc., unless explicitly and specifically defined otherwise.

It should be noted that when an element is referred to as being "attached to" another element, it may be directly on the other element or an intervening element may be present. When an element is referred to as being "connected" to another element, it may be directly connected to the other element or an intervening element may be present.

An antenna assembly according to an embodiment of the present disclosure is applied in an electronic device. In an embodiment, the electronic device may include a mobile phone, a tablet computer, a notebook computer, a palmtop computer, a Mobile Internet Device (MID), a wearable device such as a smart watch, a smart bracelet, a pedometer, etc., or other communication units provided with an array antenna assembly.

Figure 1:
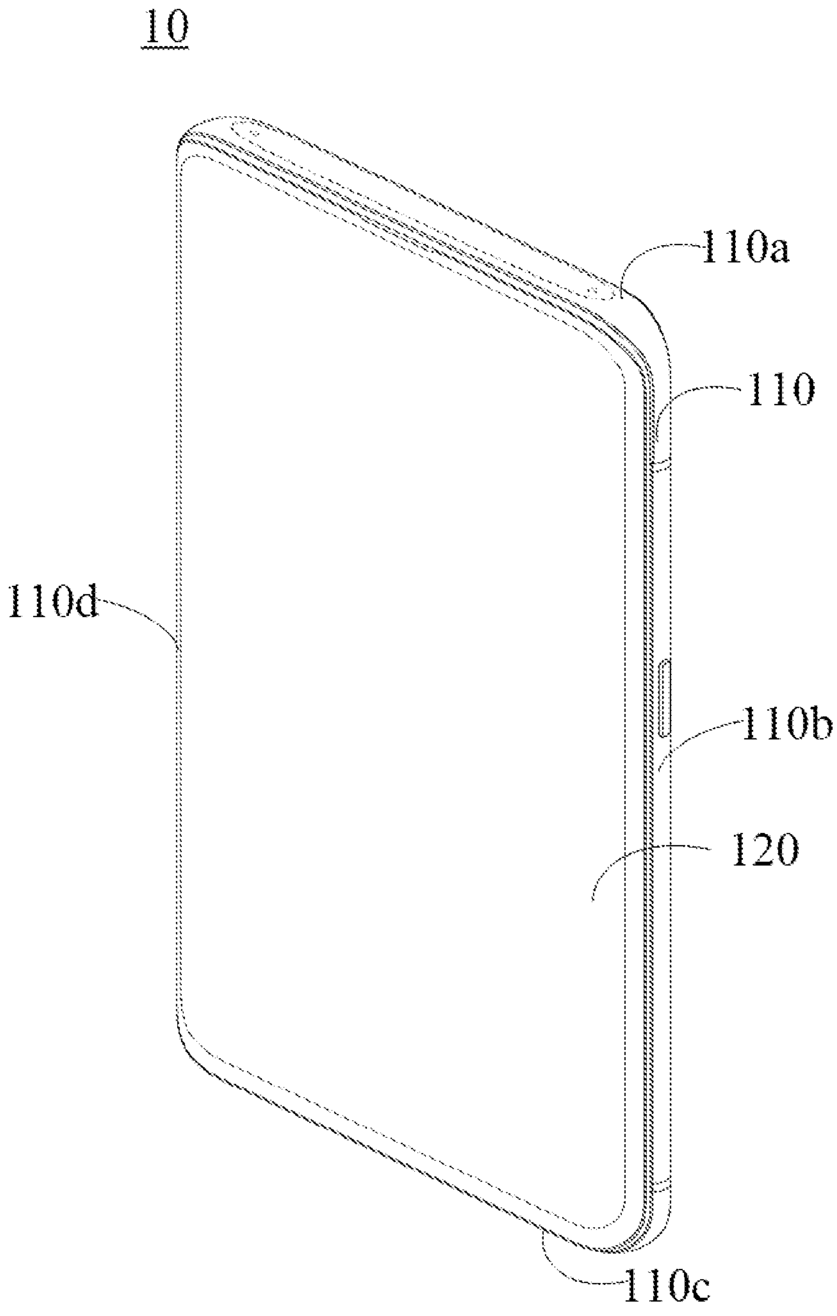
FIG. 1 is a schematic perspective structure view of an electronic device according to an embodiment.

As illustrated in FIG. 1, in the embodiment of the present disclosure, an electronic device 10 may include a conductive frame 110, a back cover, a display screen assembly 120, a substrate 130, and a radio frequency circuit. The display screen assembly 120 is fixed on a housing assembly formed by the conductive frame 110 and the back cover. The display screen assembly 120 and the housing assembly are together formed as an external structure of the electronic device 10. The display screen assembly 120 may be configured to display pictures or texts, and can provide a user an operation interface.

The back cover is configured to form an outer contour of the electronic device 10. The back cover may be integrally formed. During forming the back cover, structures such as a rear camera hole, a fingerprint identification unit, an antenna assembly mounting hole and the like may be formed on the back cover. The back cover may be a non-metal back cover. For example, the back cover may be a plastic back cover, a ceramic back cover, a 3D glass back cover, or the like.

In an embodiment, the conductive frame 110 may be a frame structure having a through hole. The conductive frame 110 may be a metal frame made of aluminum alloy and magnesium alloy for example.

In an embodiment, the conductive frame 110 is a rounded rectangular frame. The conductive frame 110 may include a first frame 110*a*, a second frame 110*b*, a third frame 110*c* disposed opposite to the first frame 110*a*, and a fourth frame 110*d* disposed opposite to the second frame 110*b*. The second frame 110*b* is connected to the first frame 110*a* and the third frame 110*c*, respectively. The first frame 110*a* may be interpreted as a top frame of the electronic device 10, and the third frame 110*c* may be interpreted as a bottom frame of the electronic device 10. In addition, the second frame 110*b* and the fourth frame 110*d* may be interpreted as side frames of the electronic device 10.

The antenna assembly may be partially or completely formed by a part of the conductive frame 110 of the electronic device 10. Exemplarily, a radiator of the antenna assembly may be partially formed or integrated on at least one of the top frame, the bottom frame and the side frames of the electronic device 10.

The substrate 130 may be accommodated in an accommodation space defined by the conductive frame 110 and the back cover. The substrate 130 may be a Printed Circuit Board (PCB) or a Flexible Printed Circuit (FPC). Some of radio frequency circuits for processing radio frequency signals may be integrated on the substrate 130, and a controller for controlling an operation of the electronic device 10 may be also integrated on the substrate 130. The radio frequency circuit includes, but is not limited to, an antenna assembly, at least one amplifier, a transceiver, a coupler, a Low Noise Amplifier (LNA), a duplexer, and the like. In addition, the radio frequency circuit can communicate with networks and other devices through wireless communication. The above wireless communication may employ any communication standard or protocol, including, but not limited to, Global System of Mobile Communication (GSM), General Packet Radio Service (GPRS), Code Division Multiple Access (CDMA), Wideband Code Division Multiple Access (WCDMA), Long Term Evolution (LTE), email, Short Messaging Service (SMS), etc.

Figure 2:
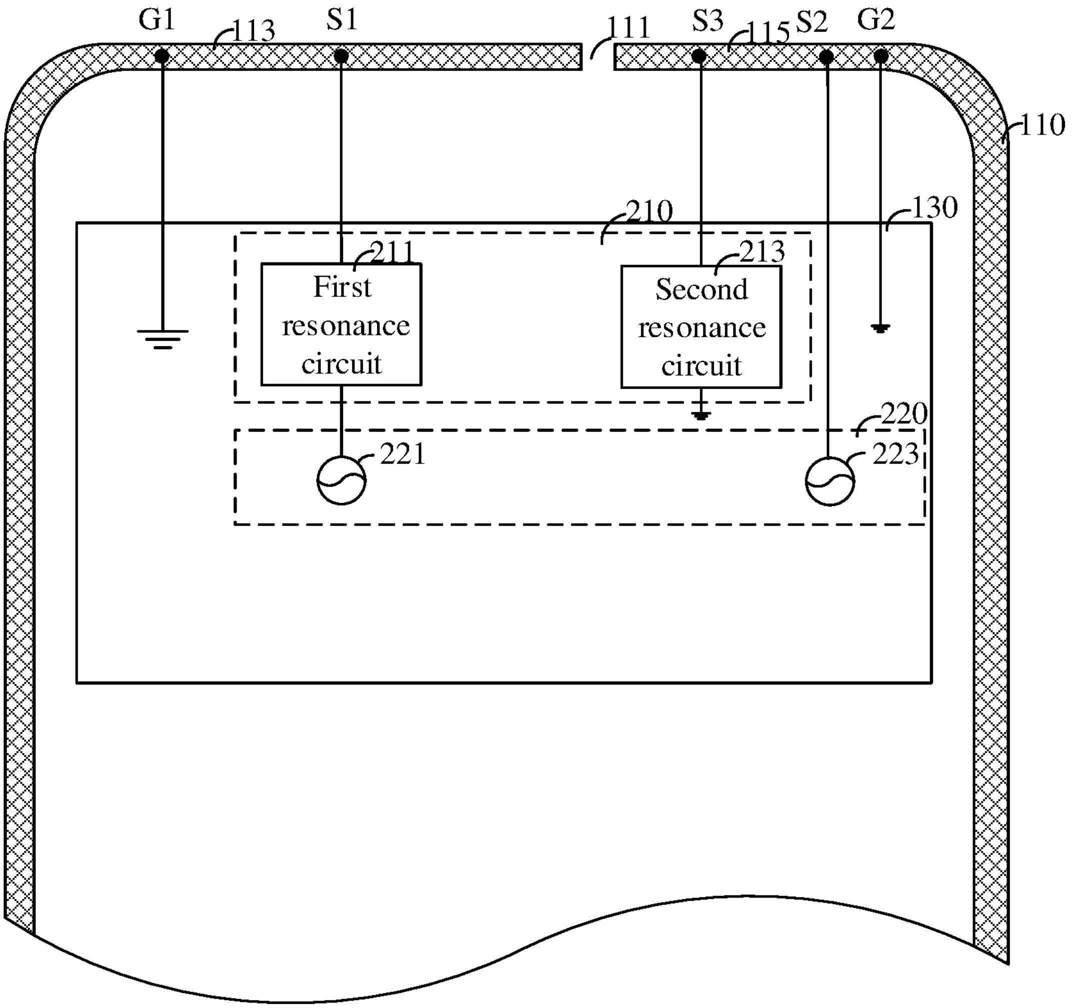
FIG. 2 is a schematic view of a first structure of an antenna assembly in an electronic device according to an embodiment.

As illustrated in FIG. 2, an antenna assembly is provided according to an embodiment of the present disclosure. The antenna assembly includes a conductive frame 110, a resonance unit 210, and a signal source unit 220.

The conductive frame 110 has at least one slot 111 defined in the conductive frame 110. The conductive frame 110 is divided by the at least one slot 111 at least into a first conductive branch 113 and a second conductive branch 115 that are independent from each other.

In an embodiment, the slot 111 is a part of the antenna assembly. The slot 111 may be interpreted as a broken slot, which can divide the conductive frame 110 into at least two separate conductive branches. Exemplarily, the conductive frame 110 can be divided by one slot at least into a first conductive branch 113 and a second conductive branch 115 that are independent from each other. When the at least one slot 111 includes N slots, the conductive frame 110 can be divided into N+1 conductive branches that are independent from each other.

In an embodiment, the slot 111 may be filled with air, plastic and/or other dielectrics.

In an embodiment, the slot 111 may have a straight shape, or may have one or more curved shapes.

It should be noted that the slot 111 may be defined at any position of the conductive frame 110. In the embodiment of the present disclosure, the shape, size, and number of the slots 111 as well as the positions of the slots 111 on the conductive frame 110 are not limited.

Each conductive branch may be provided with a feeding point correspondingly. The first conductive branch 113 is provided with a first feeding point S1, and the second conductive branch 115 is provided with a second feeding point S2.

The resonance unit 210 includes a first resonance circuit 211, and a second resonance circuit 213.

The signal source unit 220 includes a first signal source 221, and a second signal source 223. The first signal source 221 is capable of outputting a first current signal fed to the first conductive branch 113 through the first resonance circuit 211 and the first feeding point S1 sequentially. The second signal source 223 is capable of outputting a second current signal fed to the second conductive branch 115 through the second feeding point S2.

The first resonance circuit 211 is capable of filtering and tuning the received first current signal to allow the tuned first current signal to be fed to the first conductive branch 113 to generate at least one resonance frequency on the first conductive branch 113. In this way, a first radiator on the first conductive branch 113 can radiate a first radio frequency signal at least including a first satellite positioning signal.

Further, the first resonance circuit 211 is also capable of filtering out a radio frequency signal within a frequency other than a frequency corresponding to the first current signal to bring the first current signal in an ON state when the first current signal flows through the first resonance circuit 211.

One terminal of the second resonance circuit 213 is connected to the second conductive branch 115, and another terminal of the second resonance circuit 213 is grounded. A connection between the second resonance circuit 213 and the second conductive branch 115 may be referred to as a connection point S3 located between the first feeding point S1 and the second feeding point S2. The second current signal is fed from the second signal source 223 to the second conductive branch 115 through the second feeding point S2, enabling the second conductive branch 115, under a resonance of the second resonance circuit 213, to radiate the second radio frequency signal at least including the second satellite positioning signal. It should be understood that the second resonance circuit 213 is also capable of filtering out a B41 resonance excited by the first conductive branch 113.

In the above antenna assembly, the slot 111 is defined on the conductive frame 110 to allow the conductive frame 110 to be divided into the first conductive branch 113 and the second conductive branch 115. In addition, through the first resonance circuit 211, the first conductive branch 113 can radiate the first radio frequency signal at least including the first satellite positioning signal, and through the resonance of the second resonance circuit 213, the second conductive branch 115 can radiate the second radio frequency signal at least including the second satellite positioning signal. In this way, a dual-frequency positioning function can be achieved by the first satellite signal and the second satellite signal, which greatly improves positioning accuracy and achieves centimeter-level positioning. Meanwhile, a common aperture antenna design of the dual conductive branches in the embodiment of the present disclosure can allow the first radio frequency signal and the second radio frequency signal to share one slot 111, which can improve space utilization of the slot 111 and the conductive frame 110 in the electronic device 10. Meanwhile, it is not necessary to design a single antenna radiator, thereby reducing a thickness of the mobile phone.

Exemplarily, the first conductive branch 113 and the second conductive branch 115 may be integrated on the first frame 110*a* or the third frame 110*c* of the electronic device 10 to improve utilization rate of the top frame or the bottom frame, which in turn reduces challenge of integrating the antenna assembly on the side frame to reduce a cross-sectional height of the side frame. The cross-sectional height of the side frame may be reduced to less than 1 mm. The cross-sectional height of the side frame may be interpreted as a metal width of the conductive frame 110 in a thickness direction of the electronic device 10. The cross-sectional height of the conductive frame 110 is one of main factors affecting its radiation efficiency. Under the background that a side curvature of a curved screen is getting larger and larger, even if an antenna clearance of the side frame for integrating the antenna is greatly reduced, the antenna assembly may be integrated on the top frame or the bottom frame without affecting flexibility and performance of the antenna assembly.

In an embodiment, an operating frequency band of the first satellite positioning signal is an L1 (1575.42 MHz) frequency band, and an operating frequency band of the second satellite positioning signal is an L5 (1176.45 MHz) frequency band. In the embodiment of the present disclosure, the design of the common aperture antenna of the double conductive branches can simultaneously radiate the first satellite positioning signal (L1 frequency band) and the second satellite positioning signal (L5 frequency band) to achieve its dual-frequency positioning, which greatly improves the positioning accuracy and achieves the centimeter-level positioning. Meanwhile, the double conductive branches share one slot 111, which can improve the space utilization of the slot 111 and the conductive frame 110 in the electronic device 10.

It should be noted that, in the embodiment of the present disclosure, the operating frequency bands of the first satellite positioning signal and the second satellite positioning signal are not limited to the above examples. The operating frequency bands of the first satellite positioning signal and the second satellite positioning signal may include each operating frequency band of a BeiDou Navigation Satellite System (BDS) signal, a Global Navigation Satellite System (GLONASS) signal or other positioning signals.

In an embodiment, the first radio frequency signal also includes an LTE signal and WiFi that each have two operating frequency bands. The LTE signal may be divided into a low frequency signal (Low band, LB for short), a middle frequency signal (Middle band, MB for short), and a high frequency signal (High band, HB for short). In the embodiment of the present disclosure, the two operating frequency bands of the LTE signal may include the middle frequency signal and the high frequency signal. The middle frequency signal has a frequency range from 1710 MHz to 2170 MHz, and the high frequency signal has a frequency range from 2300 MHz to 2690 MHz.

The operating frequency of WiFi may include 2400 MHz to 5000 MHz. In the embodiment of the present disclosure, a first operating frequency band of WiFi may be 2.4 GHz.

In an embodiment, the second radio frequency signal also includes a 5G signal having two operating frequency bands. Specifically, the operating frequency band of the 5G signal may include at least an N78 frequency band and an N79 frequency band. The N78 frequency band has a frequency range from 3.3 GHz to 3.6 GHz, and the N79 frequency band may have a frequency range from 4.8 GHz to 5 GHz.

In the embodiment of the present disclosure, by means of the first resonance circuit 211, the first current signal is fed into the first conductive branch 113 through the first feeding point S1, and a resonance frequency resonated in the MHB frequency band of LTE (including the MB and HB frequency bands of the LTE), the L1 frequency band of GPS and the 2.4G frequency band of WIFI can be excited on the first conductive branch 113. In this way, at least two resonance frequencies of the MHB frequency band of the LTE, the L1 frequency band of GPS and the 2.4G frequency band of WIFI are generated on the first conductive branch 113. Therefore, the first radiator of the first conductive branch 113 can simultaneously radiate the first radio frequency signal in the MHB frequency band of LTE, the L1 frequency band of GPS and the 2.4G frequency band of WIFI. The second current signal is fed into the second conductive branch 115 through the second feeding point S2, and by means of the second resonance circuit 213, a resonance frequency resonated in the N78 frequency band and the N79 frequency band of 5G and the L5 frequency band of GPS can be excited on the second conductive branch 115. In this way, the second radiator of the second conductive branch 115 can simultaneously radiate the second radio frequency signal in the N78 frequency band and the N79 frequency band of 5G and the L5 frequency band of GPS.

Figure 3:
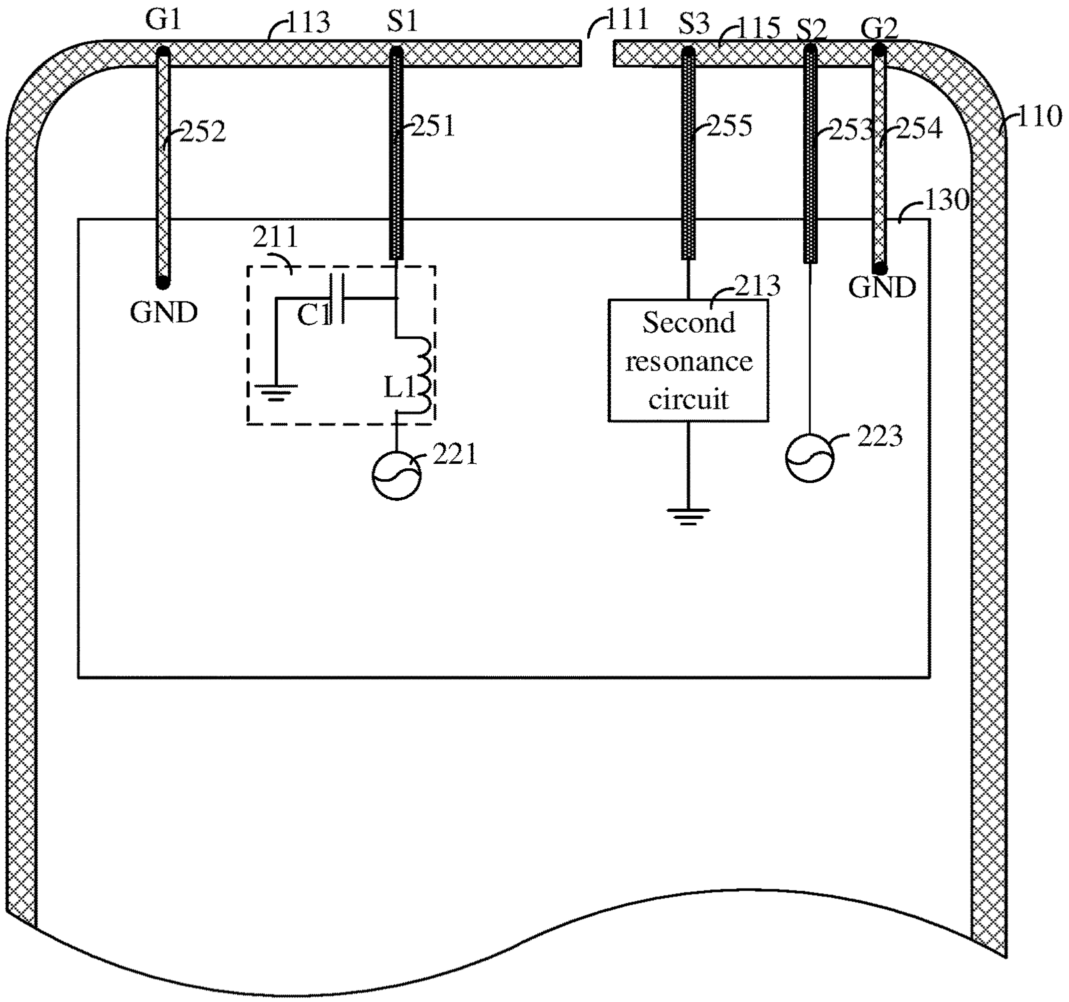
FIG. 3 is a schematic view of a second structure of an antenna assembly in an electronic device according to an embodiment.

As illustrated in FIG. 3, in an embodiment, the first conductive branch 113 also has a first grounding point G1. The first feeding point S1 is set close to the slot 111, and the first grounding point G1 is set away from the slot 111. The first conductive branch 113 between the slot 111 and the first grounding point G1 constitutes the first radiator.

Both the first signal source 221 and the first resonance circuit 211 may be disposed on the substrate 130. The first resonance circuit 211 can be coupled to the first conductive branch 113 through a first current feeding portion 251. The first current feeding portion 251 may be a conductive elastic sheet or a screw. A coupling point between the conductive elastic sheet or the screw and the first conductive branch 113 may be used as the first feeding point S1. The first feeding point S1 may be connected to the first resonance circuit 211 through the first current feeding portion 251. The first current signal output from the first signal source 221 can be fed to the first conductive branch 113 through the first feeding point S1 by the first resonance circuit 211 in a current feeding manner of the elastic sheet or the screw to excite a plurality of resonance frequencies on the first radiator.

In an embodiment, the first grounding point G1 may be connected to a ground layer of the substrate 130 through the first connection portion 252 to achieve conduction with the ground. The first connection portion 252 may be a conductor such as an elastic sheet, a screw, or a flexible circuit board. The first connection portion 252 may also be a connection arm made of the same material as the first conductive branch 113. Exemplarily, the first connection portion 252 and the first conductive branch 113 may be integrally formed to simplify the structure of the antenna assembly.

In an embodiment, the first resonance circuit 211 includes a low-pass filter circuit. The first conductive branch 113 is configured to generate two resonance frequencies under a resonance of the first resonance circuit 211.

The low-pass filter circuit may be interpreted as that the first current signal is in the ON state when passing through the first resonance circuit 211 and a non-first current signal whose frequency is higher than the corresponding frequency of the first current signal is blocked from passing through the first resonance circuit 211.

In an embodiment, the low-pass filter circuit includes a first capacitor C1 and a first inductor L1. The first inductor L1 has a first terminal connected to a first terminal of the first capacitor C1 and the first feeding point S1, and a second terminal connected to the first signal source 221. The first capacitor C1 has a first terminal that is grounded.

It should be noted that, the low-pass filter circuit may be composed of other devices, and is not limited to the examples described in the embodiments of the present disclosure.

Figure 4:
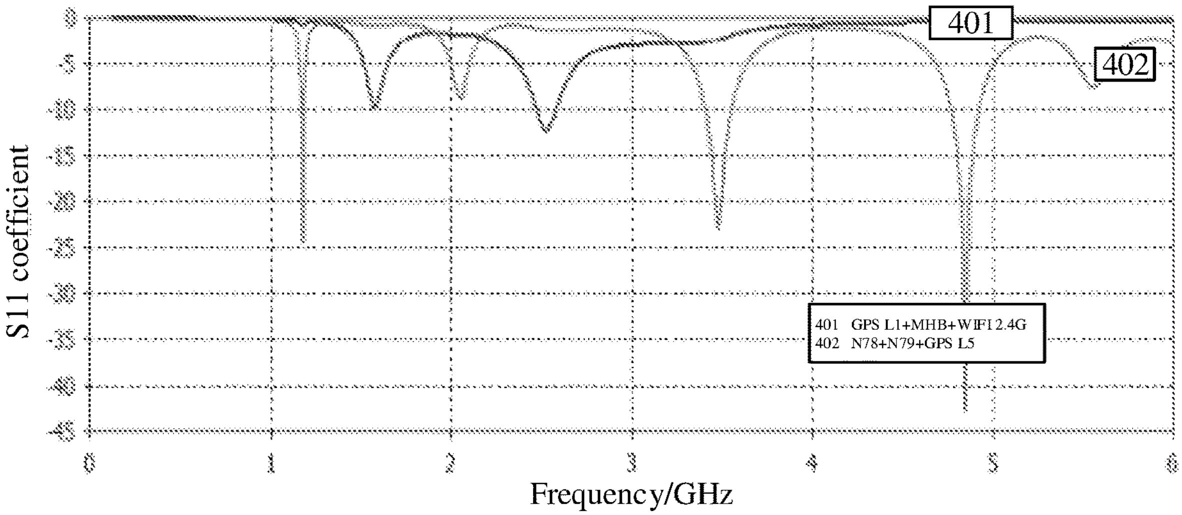
FIG. 4 is a schematic simulation graph of S11 parameter of an antenna assembly according to an embodiment.
Figure 5:
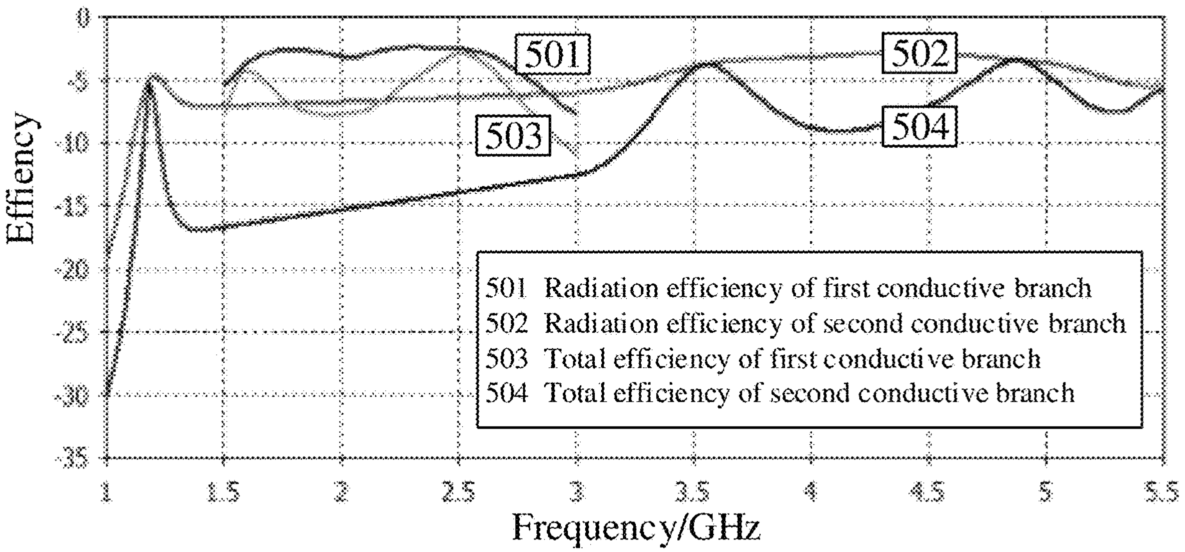
FIG. 5 is a schematic simulation graph of an efficiency of an antenna assembly according to an embodiment.

As illustrated in FIG. 4 and FIG. 5, by providing the first resonance circuit 211 in the antenna assembly, dual resonance frequencies can be generated on the first conductive branch 113. One of the dual resonance frequencies is the L1 frequency band of GPS, and the other one of the dual resonance frequencies is the 2.4G frequency band of WIFI. The MB frequency band and HB frequency band of LTE can be supported by the 2.4G frequency band of WIFI as the resonance frequency. When the first radio frequency signal is radiated from the first radiator of the first conductive branch 113, both the radiation efficiency and total efficiency of the first radio frequency signal, in each operating frequency band, radiated from the first conductive branch 113 meet the communication requirements.

Figure 6:
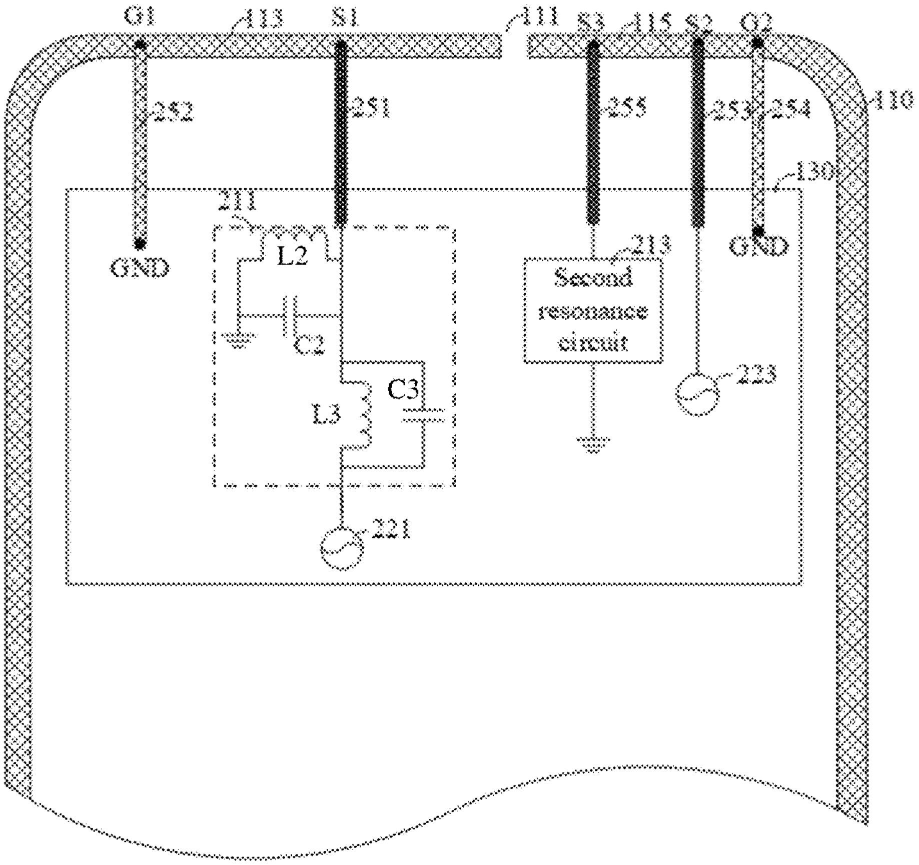
FIG. 6 is a schematic view of a third structure of an antenna assembly in an electronic device according to an embodiment.

As illustrated in FIG. 6, in an embodiment, the first resonance circuit 211 may include a band-stop and band-pass circuit. Under a resonance tuning of the first resonance circuit 211, three resonance frequencies can be generated on the first conductive branch 113.

In an embodiment, the band-stop and band-pass circuit includes a second capacitor C2, a third capacitor C3, a second inductor L2, and a third inductor L3. Both a first terminal of the second inductor L2 and a first terminal of the second capacitor C2 are grounded. A second terminal of the second inductor L2 is connected to the first feeding point S1, a second terminal of the second capacitor C2, a first terminal of the third capacitor C3, and a first terminal of the third inductor L3 correspondingly. A second terminal of the third capacitor C3 and a second terminal of the third inductor L3 are connected to the first signal source 221.

The band-stop and band-pass circuit may be interpreted as the first current signal is in an ON state when passing through the first resonance circuit 211, and a non-first current signal whose frequency is higher or lower than the corresponding frequency of the first current signal is blocked from passing through the first resonance circuit 211.

It should be noted that, the band-stop and band-pass circuit may be constituted by other devices, which is not limited to the examples described in the embodiments of the present disclosure.

The first resonance circuit 211 is provided in the antenna assembly, and thus three resonance frequencies can be generated on the first conductive branch 113. A first one of the three resonance frequencies is the L1 frequency band of GPS, a second one of the three resonance frequencies is the mid-high frequency signal frequency band of LTE, and a third one of the three resonance frequencies is the 2.4G frequency band of WIFI. When the first radio frequency signal is radiated from the first radiator of the first conductive branch 113, both the radiation efficiency and system efficiency of each operating frequency band of each first radio frequency signal meet the communication requirements.

In an embodiment, the second current signal is fed from the second signal source to the second conductive branch through the second feeding point, and three resonance frequencies are generated on the second conductive branch 115 under the resonance of the second resonance circuit, enabling the second radiator of the second conductive branch 115 to radiate the second radio frequency signal including GPS L5, 5G signals (N78, N79).

Figure 7:
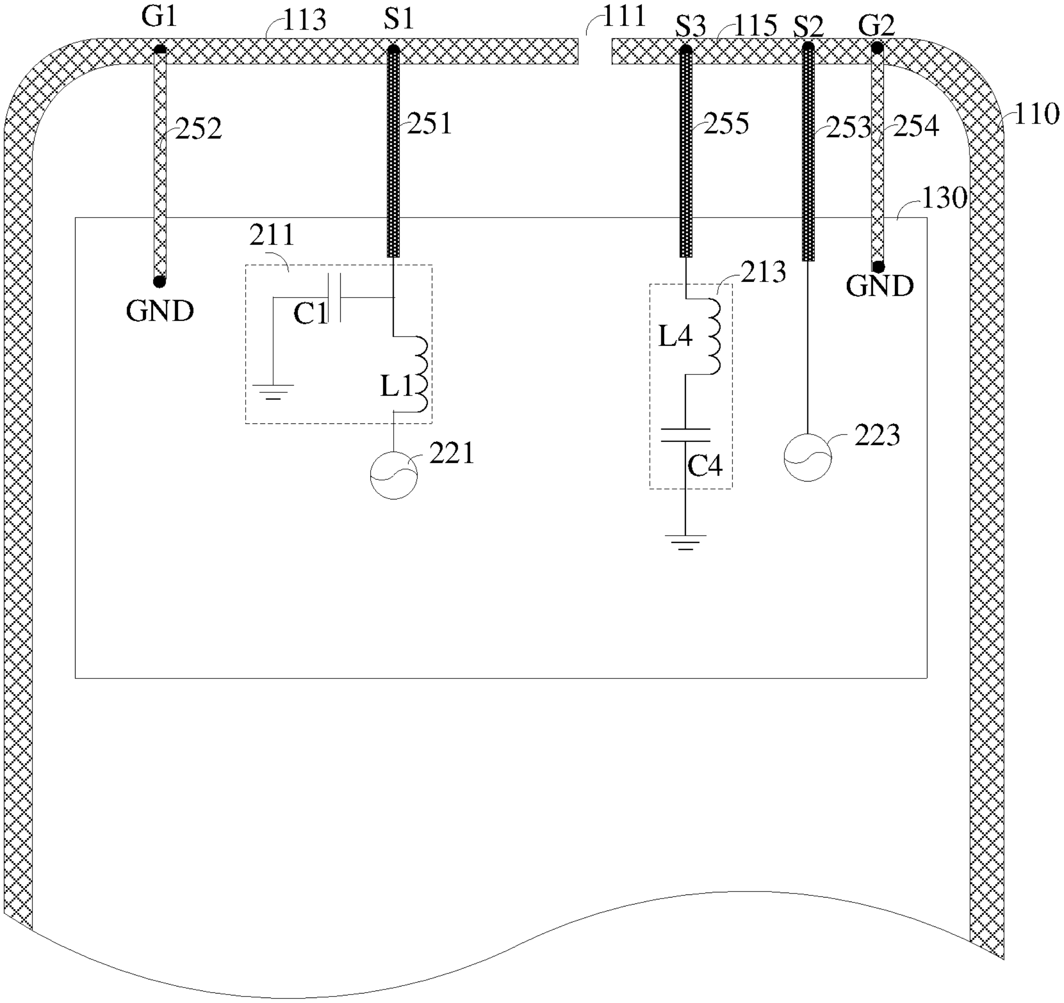
FIG. 7 is a schematic view of a fourth structure of an antenna assembly in an electronic device according to an embodiment.
Figure 8:
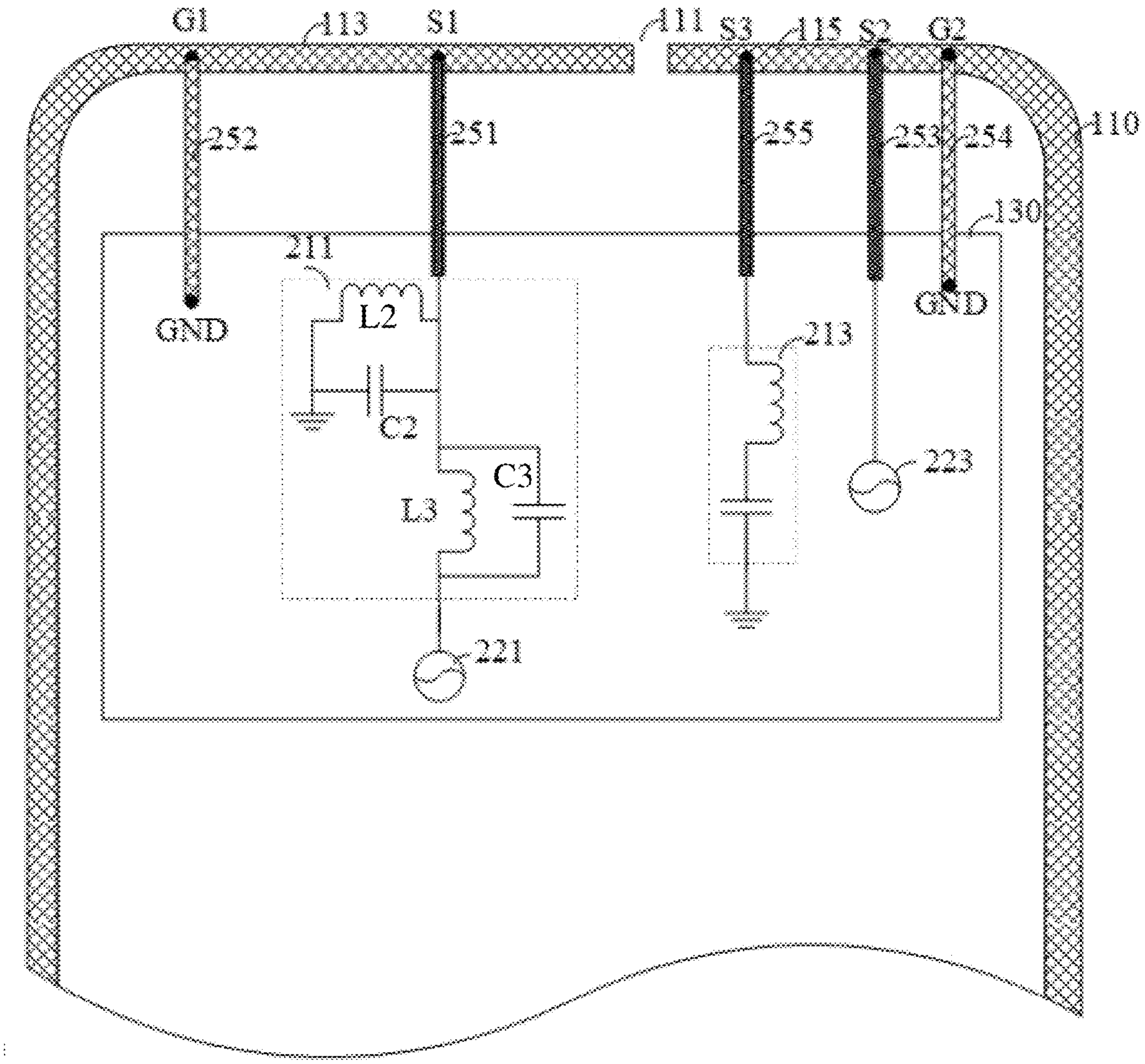
FIG. 8 is a schematic view of a fifth structure of an antenna assembly in an electronic device according to an embodiment.

As illustrated in FIG. 7 and FIG. 8, in an embodiment, the second resonance circuit 213 is a band-pass filter circuit. Specifically, the second resonance circuit 213 includes a fourth capacitor C4 and a fourth inductor L4. The second conductive branch 115 is grounded through the fourth capacitor C4 and the fourth inductor L4.

It should be noted that, the band-pass filter circuit may also be constituted by other devices, and is not limited to the examples described in the embodiments of the present disclosure.

As illustrated in FIG. 6, in an embodiment, the second conductive branch 115 also is provided with a second grounding point G2. The second feeding point S2 is set close to the second grounding point G2, and the second grounding point G2 is set away from the slot 111. The second conductive branch 115 between the slot 111 and the second grounding point G2 constitutes the second radiator.

As illustrated in FIG. 4 and FIG. 5, the second current signal is fed to the second conductive branch 115 through the second feeding point S2, and under the action of the second resonance circuit 213, the resonance frequency resonated in L5 frequency band of GPS, the N78 frequency band and the N79 frequency band of 5G can be excited on the second conductive branch 115, enabling the second radiator of the second conductive branch 115 can simultaneously radiate the second radio frequency signal of the L5 frequency band of GPS as well as the frequency band and the N79 frequency band of 5G.

In the embodiment of the present disclosure, by providing the second resonance circuit 214, it is possible to avoid a situation that a resonance at the same frequency is excited on the second conductive branch 115 when the first conductive branch 113 is operated at B41. In addition, by providing the second resonance circuit, it is possible to allow the B41 resonance excited by the first conductive branch 113 to return to ground at the second resonance circuit 214, to avoid the B41 resonance from entering the second feeding point S2 of the second conductive branch feed 115. In this way, isolation degree between the first feeding point S1 and the second feeding point S2 is greatly improved, and thus the isolation degree between the first feeding point S1 and the second feeding point S2 may be about −15 dB.

As illustrated in FIGS. 7 and 8, both the second signal source 223 and the second resonance circuit 213 may be disposed on the substrate 130, and the second signal source 223 may be coupled to the second conductive branch 115 through a second current feeding portion 253. A coupling point between the second feed portion 253 and the second conductive branch 115 may be regarded as the second feeding point S2. The second current feeding portion 253 may be a conductive elastic sheet or a screw, and may be connected to the second resonance circuit 213 through the conductive elastic sheet or the screw. The second current signal output from the second signal source 223 can be fed to the second conductive branch 115 through the second feeding point S2 in a current feeding manner of the elastic sheet or a screw. In this way, a plurality of resonance frequencies can be excited on the second conductive branch 115 to generate radiation. That is, the second radiator of the second conductive branch 115 can radiate the second radio frequency signal having a plurality of operating frequency bands.

In an embodiment, the second resonance circuit 213 may be coupled to the second conductive branch 115 through the second connection portion 255. The second connection portion 255 may be a conductor such as an elastic sheet, a screw, or a flexible circuit board. A connection point between the second connection portion 255 and the second conductive branch 115 is set close to the slot 111.

In an embodiment, the second grounding point G2 may be connected to the ground layer of the substrate 130 through a third connection portion 254 to achieve a conduction with the ground. The third connection portion 254 may be a conductor such as an elastic sheet, a screw, or a flexible circuit board. The third connection portion 254 may also be a connection arm made of the same material as the second conductive branch 115. Exemplarily, the third connection portion 254 and the second conductive branch 115 may be integrally formed to simplify the structure of the antenna assembly.

It should be noted that the frequency within the range from 7% to 13% of the resonance frequency can be interpreted as the operating bandwidth of the antenna. For example, if the resonance frequency of the antenna is 1800 MHz, and the operating bandwidth is 10% of the resonance frequency, the operating frequency band of the antenna is from 1620 MHz to 1980 MHz.

Figure 9:
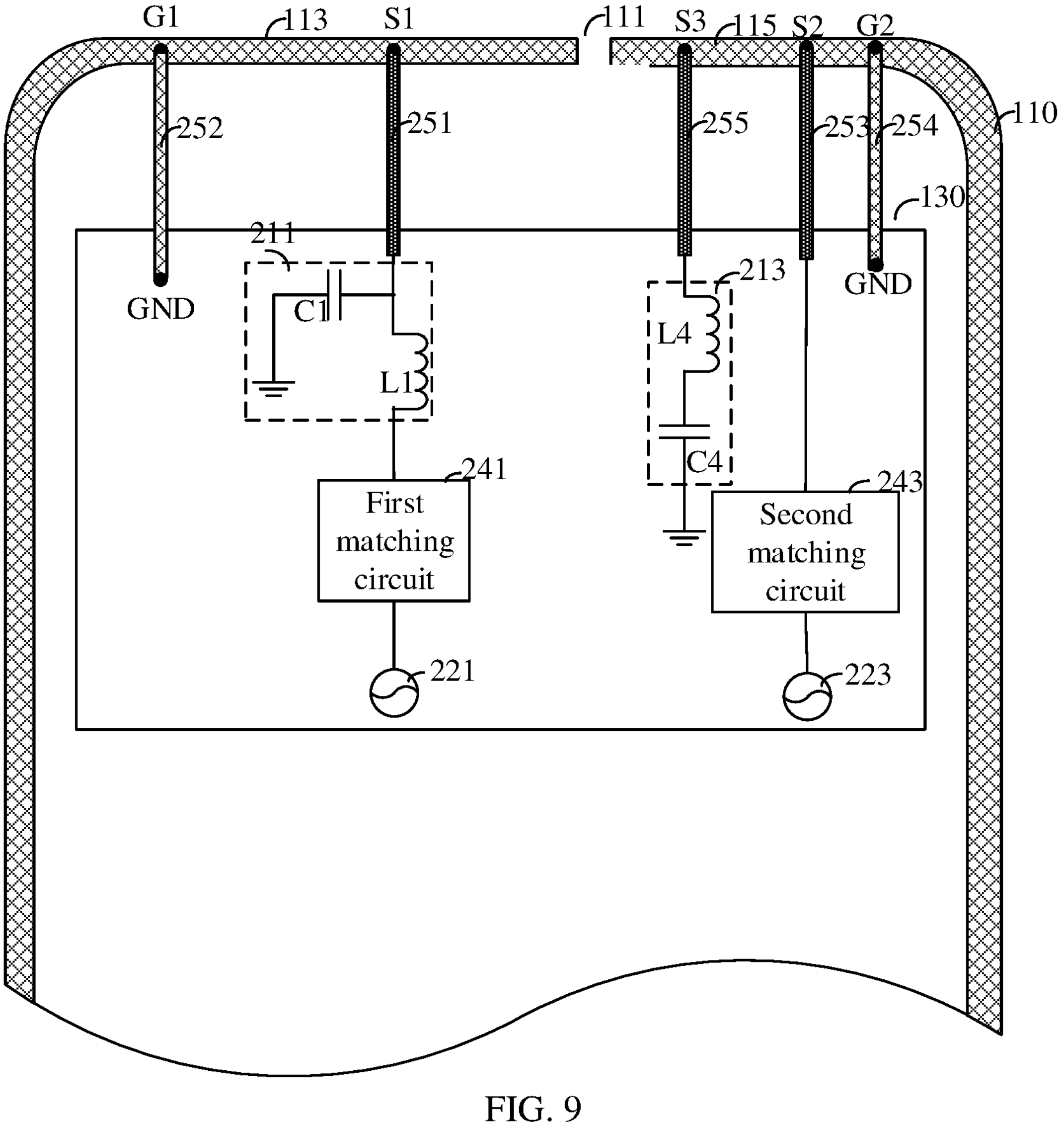
FIG. 9 is a schematic view of a sixth structure of an antenna assembly in an electronic device according to an embodiment.

As illustrated in FIG. 9, in an embodiment, a first matching circuit 241 for adjusting the first current signal is also provided between the first conductive branch 113 and the first signal source 221. The first matching circuit 241 may be configured to adjust an input impedance of the first radiator to improve transmission performance of the first radiator.

A second matching circuit 243 for adjusting the radio frequency signal of the second current signal is also provided between the second conductive branch 115 and the second signal source 223. The second matching circuit 243 may be configured to adjust an input impedance of the second radiator to improve transmission performance of the second radiator.

Specifically, the first matching circuit 241 and the second matching circuit 243 each may include a capacitor and/or an inductor, or a combination thereof. In the embodiment of the present disclosure, the specific composition forms of the first matching circuit 241 and the second matching circuit 243 are not further limited.

In the embodiment of the present disclosure, a position of the second feeding point S2 on the second conductive branch 115 and a length of the second conductive branch 115 can be reasonably set, and under the action of the second resonance circuit 213, the three resonance frequencies described above can be generated on the second conductive branch 115.

It should be noted that the first feeding point S1 may be set at a middle position of the first conductive branch 113, and the second feeding point S2 may be set close to the second grounding point G2. It should be understood that the specific position of the first feeding point S1 is associated with the first matching circuit 241. That is, the specific position of the first feeding point S1 may be set according to the first matching circuit 241. Correspondingly, the specific position of the second feeding point S2 is associated with the second matching circuit 243. That is, the specific position of the second feeding point S2 may be set according to the second matching circuit 243.

In an embodiment, the slot 111 is defined on the conductive frame 110 to divide the conductive frame 110 into the first conductive branch 113 and the second conductive branch 115. The first current signal fed to the middle position of the first conductive branch 113 can be tuned by the first resonance circuit to excite a plurality of resonance frequencies resonated in the MHB frequency band of LTE, the L1 frequency band of GPS and the 2.4G frequency band of WIFI on the first conductive branch 113. The second current signal fed to a position of the second conductive branch 115 close to the second grounding point G2 can be tuned by the second resonance circuit 213 to excite a plurality of resonance frequencies resonated in the L5 frequency band of GPS, the N78 frequency band and the N79 frequency band of 5G on the second conductive branch 115. In this way, the dual-frequency coverage of the satellite positioning signal can be achieved, which greatly improves the positioning accuracy, and the common aperture antenna of the double conductive branches design can be achieved, which allows GPS L1, GPS L5, MHB, N78, N79, WIFI signals to share one slot, and improves the space utilization of the slot and the whole machine.

In an embodiment, a plurality of slots 111 is defined on the conductive frame 110. Exemplarily, two slots are taken as an example for description. The two slots include a first slot and a second slot. The conductive frame 110 can be divided into a first conductive branch 113, a second conductive branch 115 and a third conductive branch that are independent from each other by the first slot and the second slot. A feeding point and a grounding point may be correspondingly set on each of the conductive branches. A first radiator for radiating a first radio frequency signal may be integrated on the first conductive branch 113, a second radiator for radiating a second radio frequency signal may be integrated on the second conductive branch 115, and a third radiator for radiating a third radio frequency signal may be integrated on the third conductive branch. The third radio frequency signal may be a 2G signal, a 3G signal, a Bluetooth signal, or the like.

Further, each feeding point may be connected to the filter circuit through a conductive elastic sheet or a screw, and connected to a corresponding signal source through its resonance circuit. Each signal source is capable of feeding a current signal to the corresponding conductive branch through the resonance circuit, the conductive elastic sheet or the screw, and the feeding point to allow a quarter or other modes of current to be excited on the conductive branch (radiator) between the slot and the grounding point, resulting in radiations. That is, different radio frequency signals can be radiated.

Similarly, when the conductive frame 110 has N (N>2) slots 111 defined in the conductive frame 110, the conductive frame 110 may be divided into N+1 conductive branches that are independent from each other by the N slots 11. Meanwhile, N+1 filter circuits, and N+1 signal sources may be provided correspondingly. N+1 radiators may also be integrated on N+1 conductive branches that are independent from each other, to radiate N+1 radio frequency signals. An operating frequency bands of the radio frequency signals are different from each other.

According to embodiments of the present disclosure, there is provided an electronic device 10 including a substrate 130 and the antenna assembly as described in any of the above embodiments. The substrate 130 is accommodated in a cavity enclosed by the conductive frame 110. The resonance unit 210 and the signal source unit 220 are disposed on the substrate 130.

When the antenna assembly is applied in the electronic device 10, the same slot 111 is shared by the first conductive branch 113 and the second conductive branch 115 to simultaneously achieve radiation of the first radio frequency signal and the second radio frequency signal, which can improve space utilization of the slot 111 and the conductive frame 110 in the electronic device 10. Meanwhile, it is not necessary to design a single antenna radiator, which can reduce a thickness of a mobile phone.

Exemplarily, due to the common aperture antenna design, one slot is shared by GPS L1, GPS L5, MHB, N78, N79 and WIFI2.4G, and the first radiator and the second radiator can thus be integrated on the first frame 110*a* or the third frame 110*c* of the electronic device 10, which can improve utilization rate of the top frame or the bottom frame. Thus, it is possible to further reduce the challenge of integrating the antenna assembly on the side frame and reduce the cross-sectional height of the side frame. The cross-sectional height of the side frame can be reduced to be smaller than 1 mm. The cross-sectional height of the side frame can be interpreted as the metal width of the conductive frame 110 in the thickness direction of the electronic device 10. The cross-sectional height of the conductive frame 110 is one of the main factors affecting its radiation efficiency. Under the background that the side curvature of the curved screen is getting larger and larger, the cross-sectional height of the side frame is limited, and thus the antenna clearance is greatly reduced. By employing the common aperture antenna design provided in the embodiment of the present invention, the antenna assembly can be integrated on the top frame or the bottom frame to ensure that the antenna has enough clearance. Further, the first resonance circuit and the second resonance circuit are disposed in the antenna assembly, and thus the first radio frequency at least including the first satellite positioning signal can be radiated by the first conductive branch, and the second radio frequency signal at least including the second satellite positioning signal can be radiated by the second conductive branch, which can improve the positioning accuracy. Meanwhile, under the limited length of the radiator on the top or bottom frame, the design need of multi-band and multi-antenna can be satisfied.

Any reference to a memory, a storage, a database, or other medium as used herein may include a non-volatile and/or a volatile memory. Suitable nonvolatile memory may include a read only memory (ROM), a programmable ROM (PROM), an electrically programmable ROM (EPROM), an electrically erasable programmable ROM (EEPROM), or a flash memory. The volatile memory may include a random access memory (RAM), which serves as an external cache memory. By way of illustration and non-limitation, the RAM is available in various forms such as a static RAM (SRAM), a dynamic RAM (DRAM), a synchronous DRAM (SDRAM), a double data rate SDRAM (DDR SDRAM), an enhanced SDRAM (ESDRAM), a Synchlink DRAM (SLDRAM), a Rambus Direct RAM (RDRAM), a Direct Rambus Dynamic RAM (DRDRAM), and a Rambus Dynamic RAM (RDRAM).

The technical features of the above embodiments can be combined in any suitable manner. For the sake of brevity, not all possible combinations of the technical features in the above embodiments are described. However, as long as there is no contradiction in a combination of these technical features, the combination shall fall within the scope described in this specification.

The above embodiments only represent several embodiments of the present disclosure, and the descriptions thereof are relatively specific and detailed, and should not be construed as a limitation on the scope of the present disclosure. It should be noted that for those of ordinary skill in the art, without departing from the concept of the present disclosure, several modifications and improvements can be made, which all fall within the scope of the present disclosure. Therefore, the scope of the present disclosure shall be defined by the appended claims.

What is claimed is:

1. An antenna assembly, comprising:

a conductive frame divided into a first conductive branch and a second conductive branch by a slot, wherein the first conductive branch is provided with a first feeding point, and the second conductive branch is provided with a second feeding point;

a resonance unit comprising a first resonance circuit and a second resonance circuit, wherein one terminal of the second resonance circuit is grounded, and another terminal of the second resonance circuit is connected to the second conductive branch; and a signal source unit comprising:

a first signal source capable of feeding a first current signal to the first conductive branch through the first resonance circuit and the first feeding point, enabling the first conductive branch to radiate a first radio frequency signal at least comprising a first satellite positioning signal; and a second signal source capable of feeding a second current signal to the second conductive branch through the second feeding point, enabling the second conductive branch, under a resonance of the second resonance circuit, to radiate a second radio frequency signal at least comprising a second satellite positioning signal, wherein an operating frequency band of the first satellite positioning signal is different from an operating frequency band of the second satellite positioning signal.

2. The antenna assembly according to claim 1, wherein:

the first resonance circuit comprises a low-pass filter circuit; and two resonance frequencies are generated on the first conductive branch under a resonance tuning of the first resonance circuit.

3. The antenna assembly according to claim 2, wherein the low-pass filter circuit comprises:

a first capacitor having a first terminal, and a second terminal that is grounded; and a first inductor having a first terminal connected to the first terminal of the first capacitor and the first feeding point, and a second terminal connected to the first signal source.

4. The antenna assembly according to claim 2, wherein an L1 operating frequency band of GPS, a mid-high operating frequency band of LTE, and a 2.4G operating frequency band of WiFi are supported by the two resonance frequencies.

5. The antenna assembly according to claim 3, wherein:

the first resonance circuit comprises a band-stop and band-pass circuit; and three resonance frequencies are generated on the first conductive branch under a resonance tuning of the first resonance circuit.

6. The antenna assembly according to claim 5, wherein:

the band-stop and band-pass circuit comprises a second capacitor, a third capacitor, a second inductor, and a third inductor;

a first terminal of the second inductor and a first terminal of the second capacitor are grounded;

a second terminal of the second inductor is connected to the first feeding point, a second terminal of the second capacitor, a first terminal of the third capacitor, and a first terminal of the third inductor; and a second terminal of the third capacitor and a second terminal of the third inductor are connected to the first signal source.

7. The antenna assembly according to claim 5, wherein, a first one of the three resonance frequencies is an L1 frequency band of GPS, a second one of the three resonance frequencies is a mid-high frequency signal frequency band of LTE, and a third one of the three resonance frequencies is a 2.4G frequency band of WIFI.

8. The antenna assembly according to claim 6, wherein three resonance frequencies are generated on the second conductive branch under a resonance tuning of the second resonance circuit.

9. The antenna assembly according to claim 8, wherein the second resonance circuit is a band-pass filter circuit.

10. The antenna assembly according to claim 9, wherein:

the second resonance circuit comprises a fourth capacitor and a fourth inductor that are connected in series; and the second conductive branch is grounded through the fourth capacitor and the fourth inductor.

11. The antenna assembly according to claim 8, wherein a connection point between the second resonance circuit and the second conductive branch is disposed between the first feeding point and the second feeding point, for adjusting an isolation degree between the first feeding point and the second feeding point.

12. The antenna assembly according to claim 8, wherein an L5 operating frequency band of GPS, and two operating frequency bands N78 and N79 of 5G are supported by the three resonance frequencies.

13. The antenna assembly according to claim 1, wherein:

the first conductive branch is provided with a first grounding point away from the slot;

the first feeding point is disposed at a middle position of the first conductive branch; and the first conductive branch located between the slot and the first grounding point constitutes a first radiator.

14. The antenna assembly according to claim 1, wherein:

the second conductive branch is provided with a second grounding point away from the slot;

the second feeding point is set closer to the second grounding point; and the second conductive branch located between the slot and the second grounding point constitutes a second radiator.

15. The antenna assembly according to claim 1, wherein the first resonance circuit is coupled to the first conductive branch through a first current feeding portion.

16. The antenna assembly according to claim 15, wherein the second signal source is coupled to the second conductive branch through a second current feeding portion.

17. The antenna assembly according to claim 1, wherein:

a first matching circuit configured to adjust an impedance is further disposed between the first feeding point and the first signal source; and a second matching circuit configured to adjust an impedance is further disposed between the second feeding point and the second signal source.

18. The antenna assembly according to claim 17, wherein each of the first matching circuit and the second matching circuit comprise a capacitor and/or an inductor.

19. An electronic device, comprising:

a substrate;

a conductive frame divided into a first conductive branch and a second conductive branch by a slot, wherein the first conductive branch is provided with a first feeding point, and the second conductive branch is provided with a second feeding point;

a resonance unit comprising a first resonance circuit and a second resonance circuit, wherein one terminal of the second resonance circuit is grounded, and another terminal of the second resonance circuit is connected to the second conductive branch; and a signal source unit comprising:

a first signal source capable of feeding a first current signal to the first conductive branch through the first resonance circuit and the first feeding point, enabling the first conductive branch to radiate a first radio frequency signal at least comprising a first satellite positioning signal; and a second signal source capable of feeding a second current signal to the second conductive branch through the second feeding point, enabling the second conductive branch, under a resonance of the second resonance circuit, to radiate a second radio frequency signal at least comprising a second satellite positioning signal, wherein an operating frequency band of the first satellite positioning signal is different from an operating frequency band of the second satellite positioning signal, and wherein:

the substrate is accommodated in a cavity enclosed by the conductive frame; and the resonance unit and the signal source unit are disposed on the substrate.

20. The electronic device according to claim 19, wherein the conductive frame comprises:

a first frame;

a second frame;

a third frame disposed opposite to the first frame; and a fourth frame disposed opposite to the second frame, wherein:

the second frame is connected to the first frame and the third frame; and the first conductive branch and the second conductive branch are integrated on the first frame or the third frame of the electronic device.

* * * * *